United States Patent [19]
Fini, Jr.

[11] Patent Number: 5,495,905
[45] Date of Patent: Mar. 5, 1996

[54] MODULAR MOTOR VEHICLE

[76] Inventor: Anthony W. Fini, Jr., 4273 Mundy St., Blasdell, N.Y. 14219

[21] Appl. No.: 309,733

[22] Filed: Sep. 21, 1994

[51] Int. Cl.$^6$ .................. B62D 61/00; B62D 21/00; B60G 9/02; B60G 11/10
[52] U.S. Cl. .................. 180/21; 180/211; 180/348; 180/382; 180/908; 280/694; 280/720; 280/781; 280/797; 296/191; 296/205; 296/216
[58] Field of Search .................. 180/21, 210, 211, 180/212, 213, 214, 215, 908, 253, 254, 348, 349, 374, 375, 377, 378, 382, 79.4, 79.3, 79; 280/97, 669, 694, 699, 718, 720, 781, 796, 797, 798; 296/203, 205, 185, 191, 216, 901

[56]  References Cited

U.S. PATENT DOCUMENTS

| 1,252,167 | 1/1918 | Pettit | 180/21 |
|---|---|---|---|
| 1,273,631 | 7/1918 | Leonard | 180/21 |
| 1,814,635 | 7/1931 | Schlundt | 180/21 |
| 1,833,844 | 11/1931 | Lusse | 180/21 |
| 2,202,810 | 6/1940 | Blanc | 180/21 |
| 2,232,275 | 2/1941 | Ronning | 180/21 |
| 2,477,065 | 7/1949 | Kuert et al. | 180/21 |
| 2,779,425 | 1/1957 | Miller | 180/21 |
| 3,061,031 | 10/1962 | Packard | 180/21 |
| 4,355,844 | 10/1982 | Fantini Muzzarelli | 296/205 |
| 4,368,795 | 1/1983 | Tidwell | 180/212 |
| 4,453,763 | 6/1984 | Richards | 180/215 |
| 4,732,819 | 3/1988 | Komuro | 296/205 |
| 5,116,069 | 5/1992 | Miller | 180/210 |
| 5,343,973 | 9/1994 | Lanker | 180/211 |

FOREIGN PATENT DOCUMENTS

| 0451586 | 4/1913 | France | 180/348 |
|---|---|---|---|
| 2225963 | 12/1974 | France | 180/213 |
| 0109727 | 4/1990 | Japan | 180/908 |

Primary Examiner—Margaret A. Focarino
Assistant Examiner—Peter C. English

[57]  ABSTRACT

A front wheel drive motor vehicle is made having a strong, light weight, and attractive arrow-like body made with steel square tubing. Easily removable and replaceable plastic panel inserts complete the body. Vehicle entry is step in style by rolling back the top. The top is also easily removable to make it a convertible type vehicle. The vehicles front wheels are driven through a bevel gear drive which provides a narrow wheel track and drives both front wheels simultaneously. Suspension and steering along with drive support is through a pair of special U-shaped springs. The U-shaped springs also provide a semi-independent front suspension. The vehicle has a wide rear wheel track for stability.

10 Claims, 5 Drawing Sheets

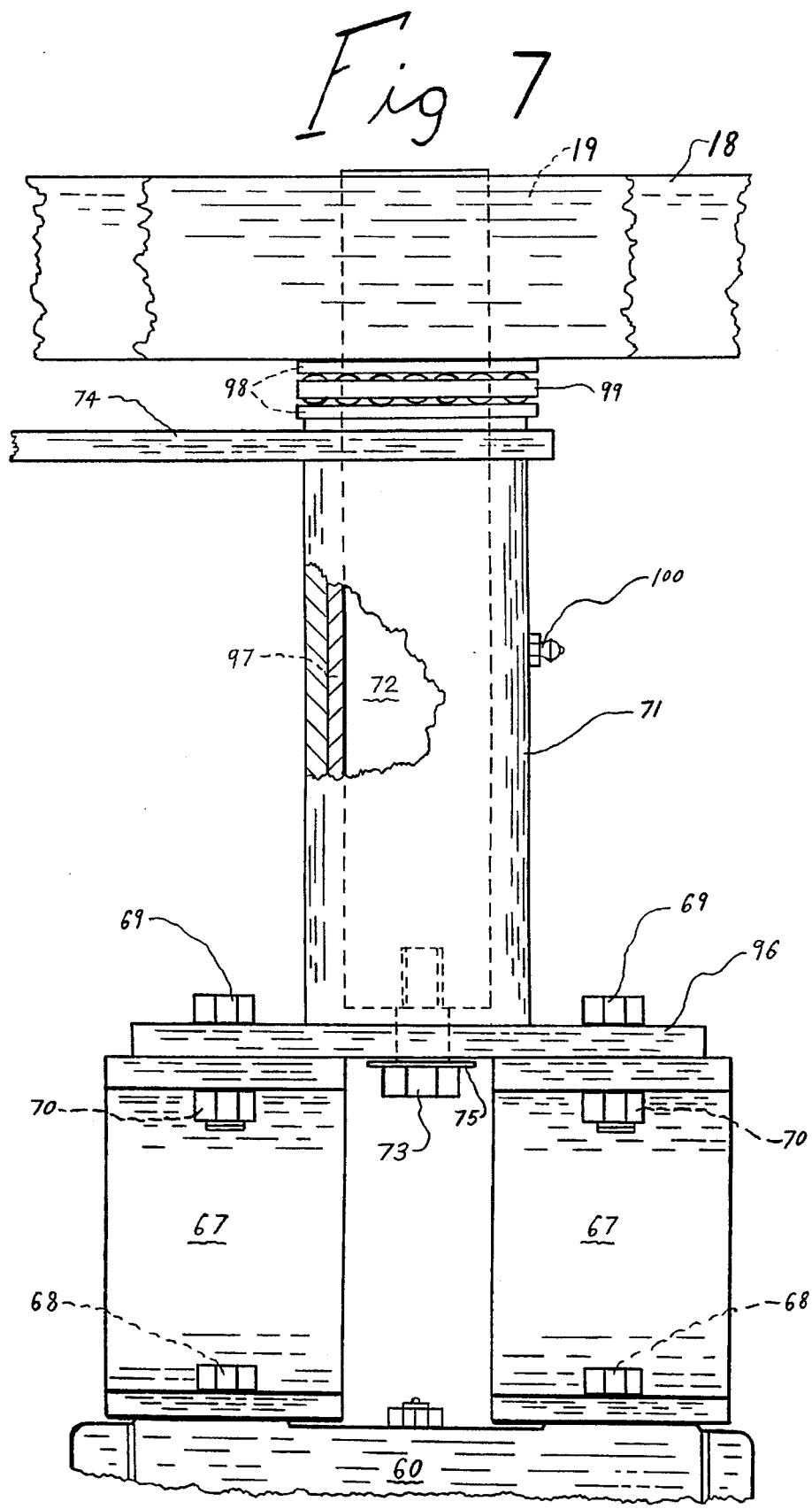

MODULAR MOTOR VEHICLE

BACKGROUND OF THE INVENTION

The field of the invention is automotive, specifically a small front wheel drive motor vehicle. Motor vehicle front wheel drive has become increasingly popular and many of these vehicles have been getting smaller and lighter, mainly for fuel conservation and lower pollution. However, their complexity has made their manufacture and repair expensive. In addition, safety in the smaller cars is of continuous concern to both manufacturers and consumers. Another automotive concern has been the ease with which a motor vehicle can be recycled.

The related art includes electric conversions as seen in U.S. Pat. No. 3,902,565 and torque converters or continuously variable transmissions as seen in U.S. Pat. No. 3,939,732. Also fiberglas and special composite materials have been used to reduce motor vehicle weight. Although the basic running gear in U.S. Pat. No. 747,909 and the front wheel drive in U.S. Pat. No. 761,657 have been substantially improved, they still prevail today in their improved state.

SUMMARY OF THE INVENTION

It is an object of the invention to provide an inexpensive, economical, low polluting, and safe front wheel drive motor vehicle. The vehicles front wheels are driven through a bevel gear drive which provides a narrow wheel track and drives both front wheels simultaneously. Suspension and steering along with drive support is through a pair of special U-shaped springs mounted to a sleeve which is on a pivot shaft secured to the front of the vehicle. The special U-shaped springs also provide a semi-independent front suspension. A wide rear wheel track for the vehicle provides good vehicle stability. The A-shaped wheel track is complimented with an arrow-like body which is very aerodynamically advantageous while affording considerable occupant safety protection. The vehicles body and frame is constructed with steel square tubing welded together at compound angles and uses screwed in plastic panel inserts to complete the body. With steel and plastic being used in this manner, both strength and lightness of weight are achieved and the separation of these materials is made easy. A further object of the invention is to provide a vehicle which is ideal for small engines utilizing mechanical torque converters or continuously variable transmissions. However, the result is that this attractive motor vehicle can utilize alternate power trains and/or power sources.

BRIEF DESCRIPTION OF THE DRAWINGS

The present invention will be more fully understood by reference to the following detailed description when read in conjunction with the attached drawings, wherein:

FIG. 7 is an enlarged and detailed, view of the front suspension and steering mechanism.

DETAILED DESCRIPTION OF THE DRAWINGS

Figure 1:
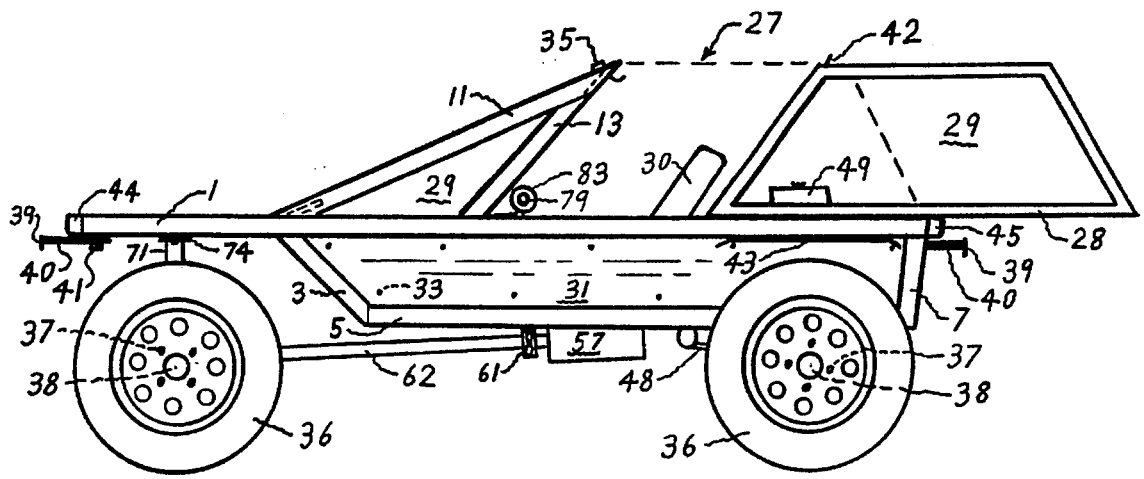
FIG. 1 is a side view of the motor vehicle.
Figure 2:
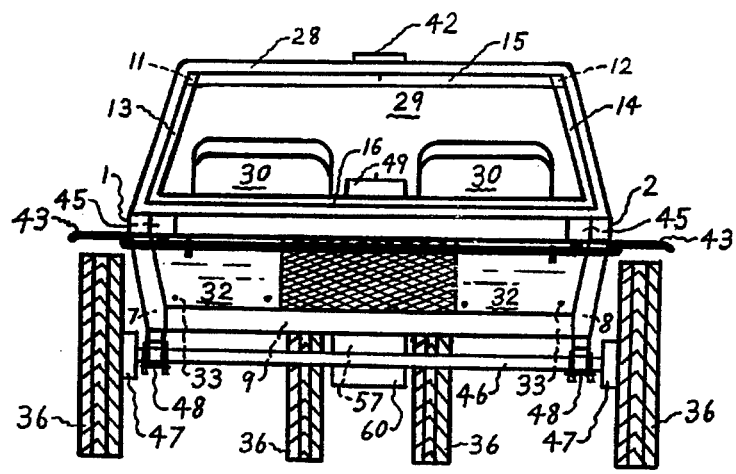
FIG. 2 is a rear view of the motor vehicle.

The motor vehicle, as shown in FIGS. 1–4, is primarily constructed with square tubing members 1–14. The main members 1,2 are parallel to each other and span the length of the vehicle. They also are the outermost sides of the vehicle. The upper members 11,12 and lower members 3,4 are angled toward the rear of the vehicle and are joined to the main members 1,2 at compound angles a distance from the front of the main members 1,2 to form an arrow-like body and frame leaving the front section under the main members 1,2 vacant for the front wheels, steering, and suspension. The compound angles together with the utilization of square tubing creates a very strong structure. The square tubing cross members 18–26 complete the body and frame and serve as a mounting means for the engine 49, transmission 57, seats 30, pivot shaft 72, and steering extension plate 80. The tubing members 1–14 and cross members 18–26 are all steel and straight square tubing, cut to the proper size and angles, and then welded together. Two thick steel strips 15,16 are also welded to the upper members 11,12 to complete the windshield frame. All flat safety glass 29 is used where indicated on the drawings. Another steel strip 17 is mounted between the main members 1,2 serving as a light bar to fasten the front lights 44. The rear lights 45 are mounted to a rear cross tubing member 10. The bumpers 39 are connected to brackets 40 which are mounted on the vehicle with bolts 41. The panel inserts 31,32 such as side panel insert 31 and rear panel inserts 32 complete the enclosure and are made of plastic. They are held in place by screws 33. Therefore, these panel inserts 31,32 can be easily removed or replaced. The top 28 is held in the closed position by a latch 34. A reference line 27 shows the position of the top 28 in the closed position. The top 28 is opened for vehicle entry by a handle 42 while holding a latch release 35. Also the top 28 can be entirely removed making it a convertible type vehicle. The rear fenders 43 are made of thick plastic and are mounted on the insides of the main members 1,2. The rear axle 46, brake drums with hubs 47, and slipper leaf springs 48 are standard trailer components.

Figure 3:
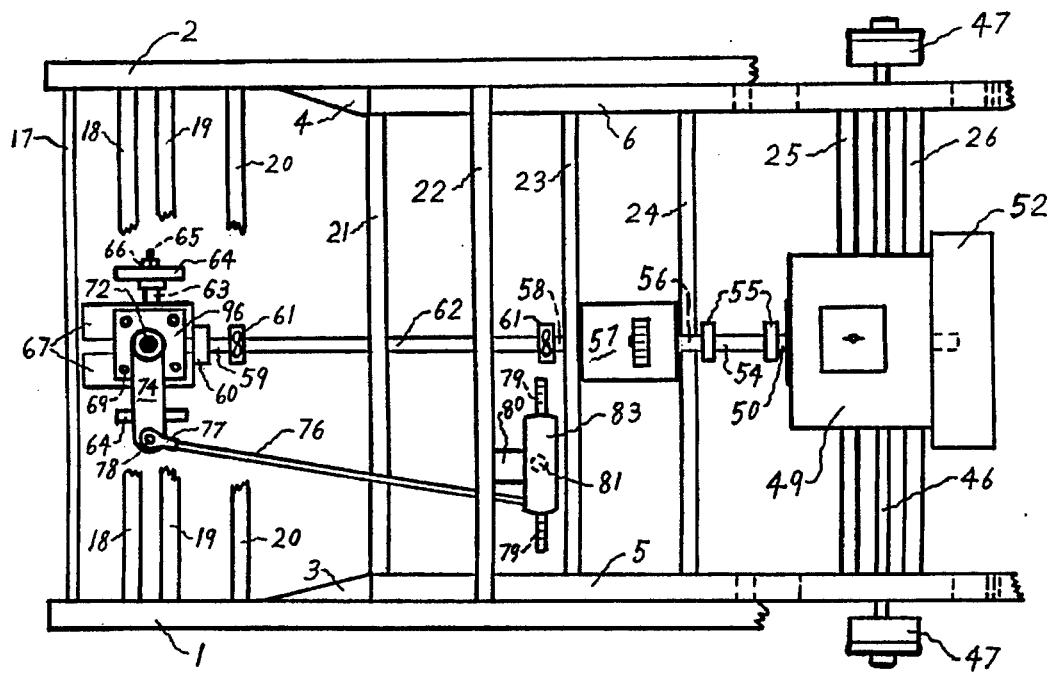
FIG. 3 is a top view of the lower frame and shows the power train and steering.
Figure 4:
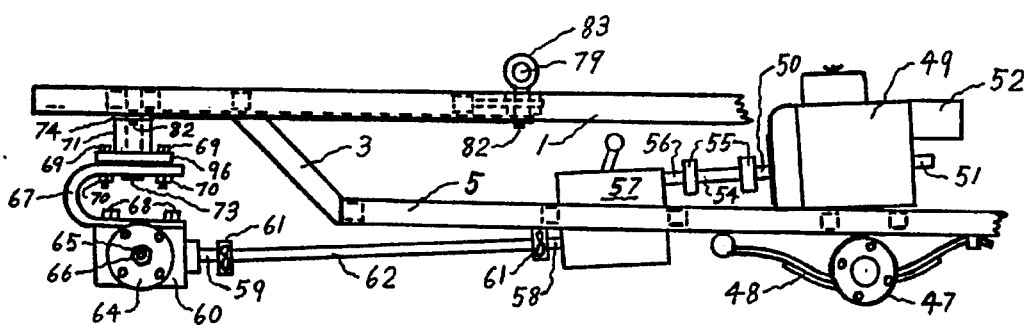
FIG. 4 is a side view of the lower frame and shows the power train and suspension.

In FIGS. 3 and 4 the wheels 36 as means for tracking, wheel caps 38, and lug bolts 37 have been removed to provide clarity in viewing the power train and front wheel drive steering and suspension. The engine 49 is equipped with a front drive extension 50 as well as the conventional crankshaft extension 51. The latter could be used as a power take off to provide power to some other accessory such as an air conditioning unit. The engine 49 also has a hot air exhaust duct 52 to expel heat through the vehicles rear screen 53. A short drive shaft 54 connects the front drive extension 50 to the input shaft 56 of the transmission 57 by two shaft couplings 55, which are standard couplings for keyed shafts. Power is delivered to the input shaft 59 of the bevel gear drive 60 through a drive shaft 62. Standard universal joints 61 for keyed shafts are used at the ends of the drive shaft 62 allowing straight and angular velocity to be transmitted to the bevel gear drive 60. Linear movement compensation is solved by the one end of the universal joint 61 left free to slide on the transmission 57 output shaft 58. Two front drive hubs 64, which are standard all terrain vehicle hubs for keyed shafts, are mounted on the ends of the cross shaft 63 of the bevel gear drive 60. The hubs 64 are held in place by threaded studs 65, which are threaded in the ends of the cross shaft 63, with retaining nuts 66. Therefore, wheel track distance from the centers of the front wheels is only about 12 inches thereby minimizing tire scrub while turning. The two special U-shaped springs 67 have mounting holes at each of their ends. One end of each spring 67 is mounted to the bevel gear drive 60 with bolts 68 while the other two ends are mounted to a plate 96 by bolts 69 and nuts 70. The plate 96 is welded to a round sleeve 71. The front cross members 18,19,20 are shown, in FIGS. 3 and 4, broken away for clarity, but the upper end of a pivot shaft 72 is welded between the two front cross members 18,19. The round sleeve 71 is rotatably mounted on the lower end of the pivot shaft 72. A lever 74 is welded on the round sleeve 71. A steering bar 79 is mounted on a pitman arm with shaft 81. An extension plate 80 is welded to a central cross member 22 and supports the pitman arm with shaft 81. Steering is actuated by the steering bar 79 through a tie rod 76 whose ends 77 are mounted on the lever 74 and the pitman arm with shaft 81 by bolts 78 and nuts 82. A shoulder bolt 73 threads into the end of the pivot shaft 72 and retains the plate 96 with the round sleeve 71 on the pivot shaft 72 while still allowing the round sleeve 71 to rotate freely on the pivot shaft 72. There is a steering mechanical advantage ratio between the lever 74 and the pitman arm with shaft 81 of approximately 2 to 1 so that less than ½ of a turn in either direction of the steering bar 79 fully turns the front wheels. The U-shaped springs 67 are thinner on the ends which mount to the bevel gear drive 60 and are thicker on the opposite ends which mount to the plate 96. This increases strength and rigidity for steering and drive support While still allowing suspension by U-shaped spring flex for the front wheels. Also the mounting of the plate 96 and the bevel gear drive 60 to the U-shaped springs 67 is so that, in a forward and most normally traveled direction of the motor vehicle, the centers of the cross shaft 63 are lagging from the center of the pivot shaft 72. This creates a negative caster angle for the front wheels and improves the tracking and stability of the vehicle.

Figure 5:
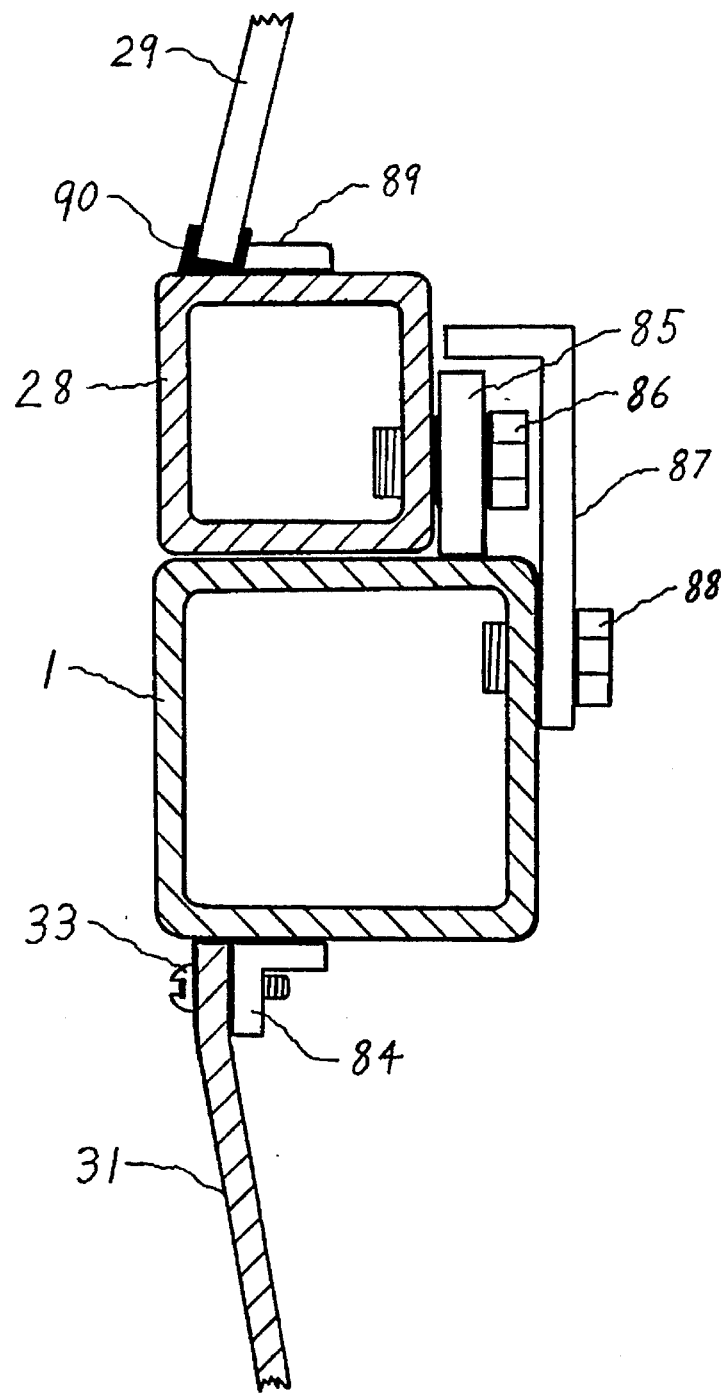
FIG. 5 is an enlarged sectional view partially showing the plastic panel inserts and top with glass.

In FIG. 5, it can be seen that the square tubing, as shown by the main tubing member 1, has rounded corners so that when the plastic panels are installed in a slightly recessed manner, as in the side panel insert 31, the appearance is stylish. Angle brackets 84 are mounted as needed so that panel screws 33 thread into them. The top 28 has bearings 85 mounted along its bottom by bolts 86 so that it can roll easily along on the main tubing members 1,2. Retaining rails 87 are secured to both inner sides of the main tubing members 1,2 by bolts 88 and serve as a guide and hold down the top 28. Glass braces 89 are mounted as needed and together with adhesive rubber molding 90 secure all vehicle safety glass 29.

Figure 6:
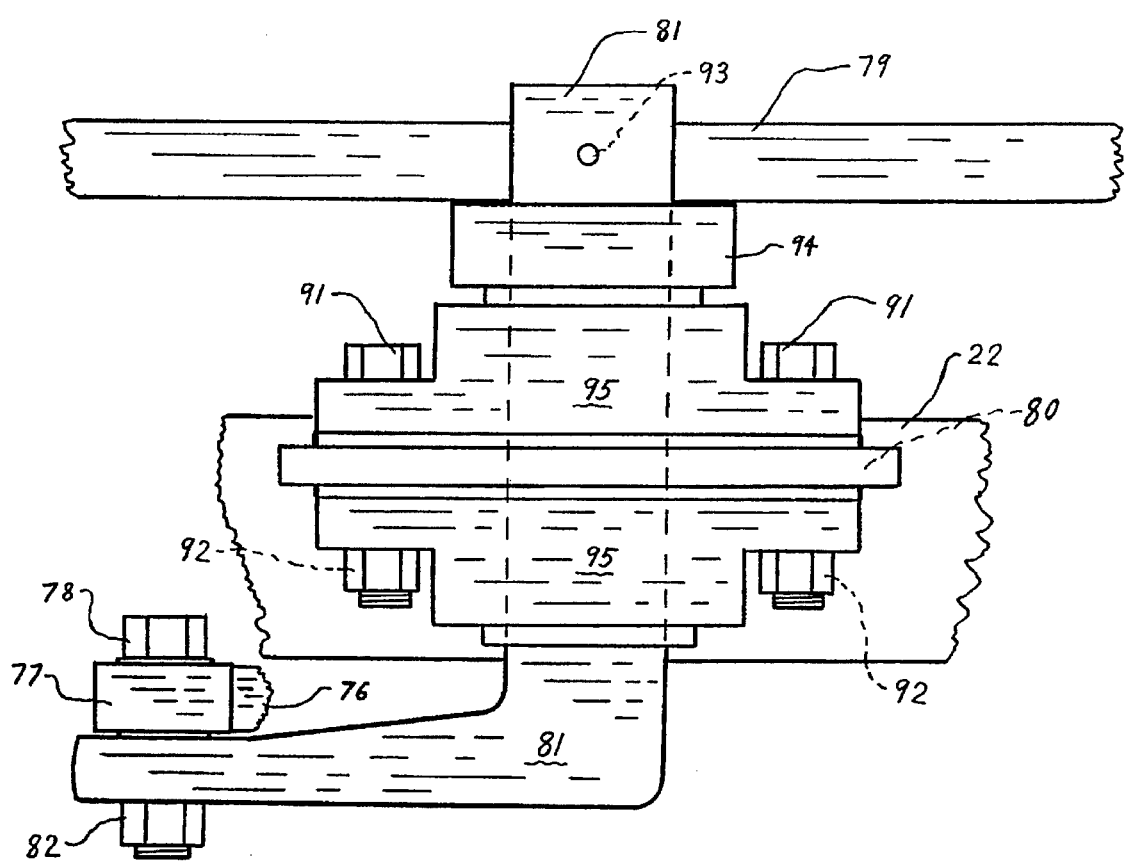
FIG. 6 is an enlarged and detailed view of the steering pitman arm with shaft.

FIG. 6 shows the pitman arm with shaft 81 and how it is mounted to the extension plate 80. The pitman arm with shaft 81 is a one piece heat treated forging and is mounted in flange bearings 95 for easy rotational movement. The flange bearings 95 are mounted to the extension plate 80 by bolts 91 and nuts 92. The steering bar 79 is mounted through a hole at the end of the pitman arm with shaft 81 and is secured by a pin 93. A spacer 94 is used to increase distance from the steering bar 79 to the extension plate 80 so that a cushioned cover 83, removed for detailed viewing, can be mounted around the steering bar 79.

FIG. 7 shows the pivot shaft 72 mounted between the two front cross members 18,19. The shoulder bolt 73 includes a brass washer 75 and a brass bushing 97 pressed into the round sleeve 71 along with a greese fitting 100 for extended wear resistance and easy rotational movement of the steering mechanism. In addition, hardened thrust washers 98 along with a thrust bearing 99 are placed on the pivot shaft 72, between the front cross members 18, 19 and the round sleeve 71, to reduce thrust force friction.

In conclusion, this attractive motor vehicles weight is in the 1,000 lb. range and is intended for 20–251 horsepower air-cooled 4-stroke cycle engines. Of course, the choice of power source and/or drive train is an option and is dependent on many factors, such as the vehicles size and weight. The vehicles primary braking effort is through the rear brakes and wheels. However, a secondary brake, not shown, is also provided through the transmission to slow or stop the front wheels via a drive shaft brake.

Although the motor vehicle has been described in detail, various additions or modifications are possible. For example, the suspension system could have small shocks added to it, the steering could include a gear reduction, and the top could be opened and closed by an electric motor. Many possibilities exist within the scope of the following claims.

I claim:

1. A vehicle having a body and frame constructed of members, means for joining said members, two main members parallel to each other and spanning the length of said vehicle and encompassing the outermost sides of said vehicle, shorter members joined to the top and bottom of said main members at angles to said main members starting at a distant point from the front of said main members and forming an arrow-like body and frame, panel inserts mounted between said members forming an enclosure for said vehicle, means for mounting said panel inserts, and the area under said main members from the front of said main members to said distant point is vacant for the front wheels, steering, and suspension of said vehicle.

2. A vehicle as specified in claim 1, wherein said members are steel and straight square tubing and said members are welded together at compound angles whereby a very strong structure is created.

3. A vehicle as specified in claim 1, wherein angle brackets are mounted on the insides of said members and screws thread into said angle brackets and said panel inserts are plastic held in a slightly recessed manner between said members by said angle brackets and screws whereby a light weight and stylish enclosure is made for said vehicle.

4. A vehicle as specified in claim 1, wherein said panel inserts and said members are recyclable materials with a simplified means for separation.

5. A vehicle as specified in claim 1, wherein a rear axle with a wide wheel track is mounted under said body and frame, cross members are welded to said members and a pivot shaft is mounted to said cross members in said vacant area, a sleeve is rotatably mounted on said pivot shaft and said sleeve is mounted to a bevel gear drive, said bevel gear drive having an input shaft and an output cross shaft and front wheels are mounted on the ends of said output cross shaft so that said front wheels rotate simultaneously and said front wheels have a narrow wheel track, means for rotating said sleeve thereby steering said vehicle, additional cross members mounted on said frame, an engine and transmission mounted on said additional cross members, said engine having a crankshaft extension, said transmission having an input shaft and an output shaft, said engine crankshaft extension is connected to said transmission input shaft for driving said transmission, a drive shaft connecting said transmission output shaft to said bevel gear drive input shaft for driving said bevel gear drive, and universal joints mounted on the ends of said drive shaft so that straight and angular velocity is transmitted to said bevel gear drive whereby vehicle stability is provided by an A-shaped wheel track and both said front wheels drive and steer said vehicle.

6. A vehicle as specified in claim 1, wherein said vehicle has retaining rails secured to both inner sides of said main members which serve as a guide and hold down a top of said vehicle, a handle mounted on said top for opening and closing said top by moving said top along on said main members, a latch for holding said top in the closed position, and a latch release so that said top can be opened whereby vehicle entry is provided when said top is opened.

7. The vehicle as specified in claim 6, wherein bearings are mounted along the bottom of said top so that said top rolls easily on said main members.

8. A vehicle having a body and frame constructed of members, means for joining said members, two main members parallel to each other and spanning the length of said vehicle and encompassing the outermost sides of said vehicle, shorter members joined to the top and bottom of said main members at angles to said main members starting at a distant point from the front of said main members and forming an arrow-like body and frame, panel inserts mounted between said members forming an enclosure for said vehicle, means for mounting said panel inserts, and the area under said main members from the front of said main members to said distant point is vacant for the front means for traction, steering, and suspension of said vehicle.

9. A vehicle steering and suspension device comprising a U-shaped spring, means for mounting one end of said U-shaped spring to means for traction of the vehicle, means for rotatably mounting the opposite end of said U-shaped spring to a body and frame of the vehicle, means for rotating said U-shaped spring thereby steering the vehicle, wherein said one end of said U-shaped spring has a smaller dimension than said opposite end of said U-shaped spring, whereby said U-shaped spring provides strength and rigidity for steering and drive support while still providing suspension for the vehicle.

10. The vehicle steering and suspension device as specified in claim 9, wherein said one end of said U-shaped spring is thinner than said opposite end of said U-shaped spring.

* * * * *